(12) United States Patent
Sugiura et al.

(10) Patent No.: US 8,963,456 B2
(45) Date of Patent: Feb. 24, 2015

(54) POWER CONVERTER AND POWER CONVERTER OF ROLLING STOCK

(75) Inventors: Tetsu Sugiura, Hitachinaka (JP); Masahiro Nagasu, Hitachinaka (JP); Motomi Shimada, Mito (JP); Ryoichi Oishi, Hitachinaka (JP); Tadanori Sato, Hitachinaka (JP); Toshio Sekine, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 197 days.

(21) Appl. No.: 13/369,367

(22) Filed: Feb. 9, 2012

(65) Prior Publication Data

US 2012/0229055 A1 Sep. 13, 2012

(30) Foreign Application Priority Data

Mar. 7, 2011 (JP) .................. 2011-049140

(51) Int. Cl.
*H02P 1/00* (2006.01)
*H02M 1/14* (2006.01)
*B60L 7/16* (2006.01)
*H02M 7/797* (2006.01)
*B60L 9/22* (2006.01)
*B60L 11/18* (2006.01)
*H02J 7/00* (2006.01)

(52) U.S. Cl.
CPC .. *H02M 1/14* (2013.01); *B60L 7/16* (2013.01); *H02M 7/797* (2013.01); *B60L 9/22* (2013.01); *B60L 11/1801* (2013.01); *H02J 2007/0039* (2013.01); *Y02T 10/7005* (2013.01); *B60L 2200/26* (2013.01)
USPC ...... 318/139; 318/130; 318/132; 318/400.31; 318/587; 307/75; 307/24; 307/10.1

(58) Field of Classification Search
CPC ............ Y02T 10/7005; Y02T 10/7022; Y02T 10/7044; Y02T 10/705; Y02T 10/7066; Y02T 10/7061; Y02T 10/6278; Y02T 10/7077; Y02T 10/70; B60L 11/005; B60L 11/1851; B60L 11/1853; B60L 11/1864; B60L 11/12; B60L 11/1803; H01L 2924/3011; H01L 2924/19041; H01L 2924/30105; H01L 2924/30107; H02M 7/5387; H02M 2001/007; H02M 1/12; H02M 2001/0022; H02M 3/1582; H02M 3/07; H02M 7/53871; H02M 7/48; H02M 7/537; H02M 7/003; H02M 3/33523; H02J 7/345; H02J 7/0054; H02J 3/01; H02J 7/022; H02P 2201/11; H02P 1/445; H02P 1/44; H02P 1/42; H02P 1/12; H02P 25/04; H02P 25/021; H02P 25/022; H02P 27/06; Y02B 70/1441; Y02E 60/12; Y02E 60/13; Y02E 40/40; Y10S 903/903; Y10S 903/907; G01R 19/16542; H05B 41/28; F04C 2240/40; G06F 1/26; H03H 7/09; H04B 15/005; H02K 17/08; H02K 57/006; D06F 37/304; B60W 10/08; B60W 20/00
USPC ............ 318/130, 132, 139, 684, 811, 400.31, 318/587, 795, 500, 505, 506, 507
See application file for complete search history.

(56) References Cited

U.S. PATENT DOCUMENTS

| | | | |
|---|---|---|---|
| 6,384,559 B2 * | 5/2002 | Egami ........................ | 318/500 |
| 2008/0309301 A1 * | 12/2008 | Shimada et al. ............. | 323/282 |
| 2010/0045247 A1 * | 2/2010 | Blanken et al. .............. | 323/273 |
| 2012/0106220 A1 * | 5/2012 | Yamaguchi et al. .......... | 363/131 |

FOREIGN PATENT DOCUMENTS

| | | | |
|---|---|---|---|
| DE | 196 21 555 | | 8/1997 |
| EP | 1 986 313 | | 10/2008 |
| EP | 1986313 | A2 * | 10/2008 |
| GB | 397201 | * | 8/1933 |
| GB | 1 307 986 | | 2/1973 |
| JP | 08331847 | A * | 12/1996 |
| JP | 09-140186 | | 5/1997 |
| JP | 2000175458 | A * | 6/2000 |
| JP | 2000-253508 | | 9/2000 |
| JP | 2002-315109 | | 10/2002 |

| | | |
|---|---|---|
| JP | 2008-67510 | 3/2008 |
| JP | 2008-131834 | 6/2008 |
| JP | 2008-131835 | 6/2008 |
| JP | 2008-141849 | 6/2008 |
| JP | 2008141849 A * | 6/2008 |
| JP | 2008-184077 | 8/2008 |
| JP | 2008-228420 | 9/2008 |
| JP | 2008-256673 | 10/2008 |
| JP | 2008-278615 | 11/2008 |
| JP | 2009-55784 | 3/2009 |
| JP | 2009-55785 | 3/2009 |
| JP | 2009-55786 | 3/2009 |
| JP | 2009-89503 | 4/2009 |
| JP | 2009-100644 | 5/2009 |
| JP | 2009-159649 | 7/2009 |
| JP | 2009-290958 | 12/2009 |
| JP | 2009-296731 | 12/2009 |
| JP | 2010-3520 | 1/2010 |
| JP | 2010-55973 | 3/2010 |
| JP | 2010-123349 | 6/2010 |
| JP | 2010-124575 | 6/2010 |
| JP | 2010-132154 | 6/2010 |
| JP | 2010-220327 | 9/2010 |
| JP | 2010-220474 | 9/2010 |
| JP | 2011-24415 | 2/2011 |
| JP | 2011-159633 | 8/2011 |

OTHER PUBLICATIONS

Technical Data on Lithium-Ion Battery, Sanyo Electric Co., Ltd. 2002, (URL: http://www.orient-technology.com/Sanyo/technote/lion_j.pdf).

Takao Hirasa, Power Electronics, 1992, pp. 83-85, Kyoritsu Shuppan co., Ltd.

* cited by examiner

*Primary Examiner* — Kawing Chan

*Assistant Examiner* — Jorge L Carrasquillo (74) *Attorney, Agent, or Firm* — Antonelli, Terry, Stout & Kraus, LLP.

(57) ABSTRACT

A power converter includes a first electric power conversion unit having an inverter for converting a first DC electric power to an AC electric power, an AC circuit connected to the first electric power conversion means;
    a second electric power conversion unit for receiving the first DC electric power and converting the same to a second DC electric power having a voltage level that differs from the voltage level of the first DC electric power, a power storage unit for storing the second DC electric power of the second electric power conversion unit; and a ripple suppressor having a first inductance for guiding the second DC electric power of the second electric power conversion unit to the power storage means and a second inductance for suppressing the ripple component included in the second DC electric power arranged between the second electric power conversion unit and the power storage unit.

1 Claim, 6 Drawing Sheets

POWER CONVERTER AND POWER CONVERTER OF ROLLING STOCK

The present application is based on and claims priority of Japanese patent application No. 2011-049140 filed on Mar. 7, 2011, the entire contents of which are hereby incorporated by reference.

BACKGROUND OF THE INVENTION

1. Field of the Invention

The present invention relates to a power converter preferably applied to a controller for controlling an electric motor which is used as a drive source of a rolling stock, for example, and more specifically, relates to a power converter comprising an inverter, an AC load receiving electric power from the inverter, and a battery connected in parallel with the inverter.

2. Description of the Related Art

Inverters widely used in the industrial world mainly adopt a system for converting DC electric power to AC electric power via variable voltage variable frequency (VVVF) control using a pulse width modulation (PWM) system.

For example, in the field of rolling stocks, a variable voltage variable frequency (hereinafter abbreviated as VVVF) inverter is used as a system for driving the AC motor of the rolling stock. The rolling stock is accelerated by driving the electric motor via the VVVF inverter, and a regeneration brake control is performed widely in which the electric motor is operated as a generator during braking operation so as to convert kinetic energy into electric energy and to return the same to an overhead trolley (hereinafter referred to as overhead cable).

Recently, an art of applying the battery to effectively utilize the regeneration electric power obtained via regeneration braking and to realize further energy saving has been studied and put to practical use.

For example, patent document 1 teaches an art of driving the rolling stock highly efficiently by connecting a battery in parallel with an input side of an inverter in a power converter, so as to store the regeneration energy and effectively utilize the same.

Further, patent document 2 discloses an art in which a battery is connected in series to a ground side of the input of the inverter so as to elevate the input voltage of the inverter, according to which the characteristic area of the high speed side of the electric motor is expanded and the performance of regeneration braking acquiring braking force by consuming the rotational energy of the electric motor or of power running for driving the rolling stock is enhanced.

The VVVF inverter is also used in inverter air-conditioners and the like in the field of home electrical appliances.

Patent Document 1: Japanese Patent Application Laid-Open Publication No. 2009-89503

Patent Document 2: Japanese Patent Application Laid-Open Publication No. 2008-278615

Non-Patent Document 1: Technical Data on Lithium-Ion Battery, Sanyo Electric Co., Ltd (2002) (URL: http://www.orient-technology.com/Sanyo/technot/lion_J.pdf)

Non-Patent Document 2: Power Electronics, Takao Hirasa, (p. 83-85), Kyoritsu Shuppan Co., Ltd (1992)

According to a controller of a rolling stock equipped with a battery, during reduction of regeneration load, the regeneration electric power can be absorbed and stored in the battery, so that meaningless consumption of kinetic energy of the rolling stock can be prevented, and simultaneously, the consumption of air brake and the like due to reduction of regeneration brake force can be cut down.

On the other hand, if a power storage battery is used as the battery, the power storage battery has a drawback in that generally, repeated discharge and charge thereof causes resolution of the electrolytic solution, which leads to characteristic degradation of the power storage such as the increase of internal resistance or the deterioration of battery capacity. Further, it is known that the speed of degradation is accelerated by over-charge and over-discharge of the battery or by the increase of temperature accompanying the same (refer to non-patent document 1).

The discharge and charge of power of the battery is controlled via a power converter such as a DC-DC converter. Such a power converter is generally composed of a power semiconductor device, wherein the power semiconductor device is subjected to switching control so as to control the electric power being discharged from or charged to the battery, so that harmonic distortion is contained therein, similar to the aforementioned VVVF inverter. The ripples contained in the discharge and charge currents or the repeated precipitous change of currents lead to accelerated degradation of the battery, so that suppression thereof is desired.

Known methods for suppressing the ripples superposed via the power converter generally relate to increasing the capacity of the reactor arranged within the power converter and increasing the switching frequency of the power semiconductor device (refer to non-patent document 2).

On the other hand, the power storage capacity of the battery disposed in the rolling stock is set so as to absorb all the regeneration electric power generated via regeneration braking, but since the mounting area under the floor of the vehicle is limited, it is preferable that a battery with a minimum battery capacity is mounted on the vehicle.

However, the reactor within the power converter has a high capacity and weight, and the increase in the size thereof is not desirable since the area under the floor of the vehicle is limited. It is also not desirable to increase the switching frequency of the power semiconductor device since the switching loss causes heat generation.

SUMMARY OF THE INVENTION

The present invention aims at solving the prior art problems mentioned above by providing a power converter and a power converter of a rolling stock capable of absorbing ripples superposed via the power converter and suppressing characteristic degradation caused by over-charge and over-discharge of the battery.

In order to achieve the above object, the present invention provides a power converter comprising an electric motor for driving a rolling stock, an inverter for controlling the electric motor, a battery for absorbing regeneration electric power of the electric motor, and a DC-DC converter for controlling the electric power absorbed via the battery, wherein a ripple suppression means for absorbing the current ripple superposed via the DC-DC converter is connected in parallel with respect to the battery, wherein the connection is performed so that the inductance of the electric wiring connected between the capacitor and the DC-DC converter becomes smaller than the inductance of the electric wiring connected between the battery and the DC-DC converter.

According to the present invention, the current ripple superposed via the DC-DC converter can be absorbed by the capacitor, so that the characteristic degradation caused by over-charge and over-discharge of the battery can be suppressed.

DETAILED DESCRIPTION OF THE PREFERRED EMBODIMENTS

The present invention is preferably applied to a power converter of rolling stocks, and in the following description of the background art and preferred embodiments, the present invention is applied to a controller or a power converter of a rolling stock as an example, but the present invention can be applied to power converters other than for rolling stocks, and the applicable range of the present invention is not restricted to those illustrated in the present description.

Figure 6:
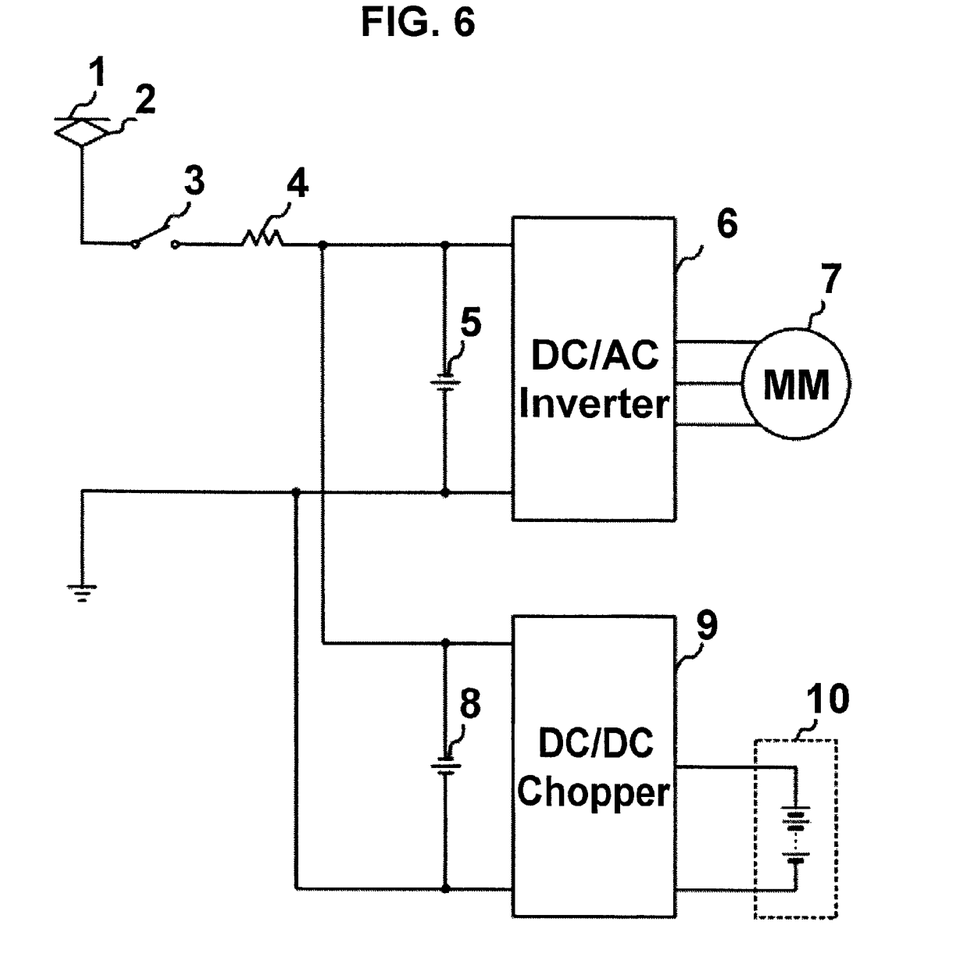
FIG. 6 is a configuration diagram of a power converter having a battery according to the prior art.

FIG. 6 illustrates one example of a power converter having a battery mounted thereon, and the configuration of the power converter will be described with reference to FIG. 6.

In FIG. 6, reference number 1 denotes an overhead trolley, 2 denotes a current collector, 3 denotes a contactor, 4 denotes a reactor, 5 and 8 denote a capacitor, 6 denotes a DC-AC converter constituting an inverter (hereinafter referred to as an inverter), 7 denotes an electric motor, 9 denotes a DC-DC converter constituting a chopper, and 10 denotes a battery.

Now, the inverter 6 and the DC-DC converter 9 are generally composed of a power semiconductor device. According to electric power conversion via a PWM system, DC electric power is converted to AC electric power via switching of the power semiconductor device, but during this electric power conversion, harmonic distortion is known to occur. Therefore, the harmonic distortion caused by the inverter 6 is designed to be absorbed via a filter circuit composed of a reactor 4 and a capacitor 5, and the harmonic distortion caused by the DC-DC converter 9 is designed to be absorbed via a filter circuit composed of a reactor 4 and a capacitor 8. According to this arrangement, harmonic distortion can be prevented from flowing into the overhead trolley 1.

During power running of the rolling stock, DC electric power is allowed by the power converter to enter from an overhead trolley 1 via a current collector 2 and through a line breaker 3, a reactor 4 and a capacitor 5 to be fed to the inverter 6, and thereafter, by having the DC electric power converted to three-phase AC electric power in the inverter 6, the electric power drives the electric motor 7 to accelerate the vehicle.

During regeneration, the vehicle is decelerated via regeneration brake power, and at the same time, the regeneration electric power generated by the electric motor 7 is returned to the overhead trolley through the same path used during power running, according to which the regeneration electric power can be used as electric power for enabling power running to be performed in other vehicles on the same track.

On the other hand, according to the present device configuration, even if there is not enough rolling stock performing power running on the same track during the above-described regeneration control, by absorbing the regeneration electric power generated via the electric motor 7 in a battery 10, it becomes possible to efficiently utilize electric power by reducing the number of times of ineffective regeneration caused by continuous operation of the regeneration brake during which regeneration electric power cannot be fully returned.

In this example, the regeneration electric power generated from the electric motor 7 is charged via an inverter 6, a capacitor 5, a capacitor 8 and a DC-DC converter 9 to a battery 10. Now, the electric power charged to the battery 10 is controlled via the DC-DC converter 9.

Further, the electric power charged in the battery 10 is discharged through the same path used for charging of the battery 10 to be utilized as auxiliary power for controlling power running of the vehicle, and also as electric power for emergency running of the vehicle to a station when supply of electric power cannot be received such as when power failure occurs to the overhead trolley 1.

However, the illustrated example lacks to consider the above-mentioned problems of the prior art. The present invention aims at solving the above-mentioned problems by providing a power converter described below.

Now, the preferred embodiments of the present invention will be described with reference to the drawings.

Embodiment 1

Figure 1:
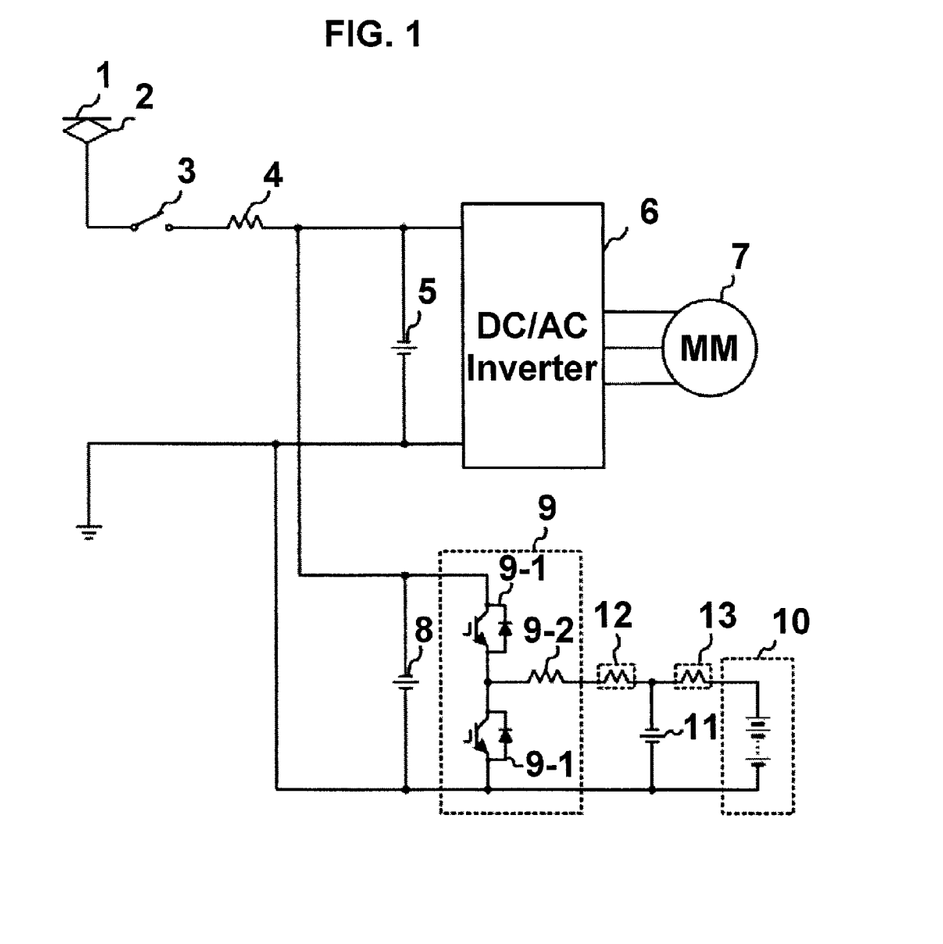
FIG. 1 is a configuration diagram of a power converter according to the (first embodiment of the) present invention applied to a rolling stock.

FIG. 1 is a view illustrating a first embodiment of a power converter of a rolling stock according to the present invention. The same sections as FIG. 6 are denoted with the same reference numbers.

According to the power converter illustrated in FIG. 1, reference number 1 denotes an overhead trolley (overhead cable), 2 denotes a current collector for collecting the DC electric power of the overhead trolley 1, 3 denotes a contactor (high-speed breaker, line breaker), 4 denotes a reactor, 5 denotes a capacitor, 6 denotes an inverter constituting a DC-AC converter (first conversion control means), wherein these components constitute a first electric power conversion means. The reactor 4 and the capacitor 5 constitute a filter circuit for smoothing the DC electric power. Reference number 7 denotes an electric motor driven by the AC electric power supplied from the inverter 6, which constitute an AC circuit.

Reference number 9 denotes a DC-DC converter (second conversion control means) connected in parallel with the inverter 6, wherein the conversion equipment is composed of a switching section composed of two switching devices 9-1 adopting a series configuration connected to the electric wiring and a ground wire disposed on the current collector side, and a reactor 9-2 connected to a connection section of the switching device. A capacitor 8 is connected on a front side of the DC-DC converter 9, constituting a second electric power conversion means. The DC-DC converter 9 is connected in parallel with the inverter 6 and functions to absorb the DC electric power generated from the inverter.

Reference number 10 denotes a battery (first power storage means) for storing DC electric power from the DC-DC converter, which is composed for example of a battery.

Reference numbers 12 and 13 denote electric wiring for connecting the reactor 9-2 of the DC-DC converter 9 and one of the electrodes of the battery 10, wherein the electric wiring has a desired inductance. Reference number 11 denotes a capacitor connected between the electric wiring 12 and 13 and the other electrode (ground wire) of the battery 10, which has a power storage function. These components constitute a ripple suppression means for suppressing ripple components and preventing the same from being supplied from the DC-DC converter to the battery 10. Ripple suppression refers to a technique of reducing ripple components moderately so as not to affect the battery 10.

Now, the inductance contained in the electric wiring 12 is referred to as Lc, and the total inductance contained in the electric wiring 12 and the electric wiring 13 is referred to as Lb.

Further, the battery 10 has a property in which the battery capacity is greater than the capacitor 11, and the capacitor 11 has a property of enabling a greater current to be flown than the battery 10.

By connecting the battery 10 and the capacitor 11 via the arrangement illustrated in FIG. 1, the relationship shown in the following expression (1) is realized regarding the inductance Lc contained in the electric wiring 12 and the total inductance Lb contained in the electric wiring 12 and electric wiring 13.

$$Lc < Lb \qquad \text{Expression (1)}$$

Now, an example of decelerating a vehicle via regeneration braking will be described as an operation example of FIG. 1.

The regeneration electric power generated from the electric motor 7 via regeneration braking is output through the inverter 6, the capacitor 5, the reactor 4 and the contactor 3 and via the current collector 2 to the overhead trolley 1, but if the regeneration electric power cannot be absorbed by an electric power substation or if no vehicle performing power running exists on the same track, the power can be charged via the inverter 6, the capacitor 5, the capacitor 8 and the DC-DC converter 9 to the battery 10.

The charging electric power to the battery 10 is controlled by operating the switching device 9-1 of the DC-DC converter 9, but at this time, when the electric power is converted, ripples are superposed to the voltage and the current within the DC-DC converter 9. Furthermore, it is known that characteristic degradation of power storage properties of the battery 10 is hastened by overcurrents, so it is desirable to suppress ripples and the extreme changes of the discharge and charge currents.

Now, the current flowing through the reactor 9-2 is flown through the electric wiring 12 to the capacitor 11 and also through the electric wiring 12 and electric wiring 13 to the battery 10, but since the relationship of above-described expression (1) is satisfied of the inductance Lc contained in the electric wiring 12 and the inductance Lb contained in the electric wiring 12 and the electric wiring 13, so that the DC components of the regeneration electric power flows to the battery 10 having a large inductance while ripples being AC components flow to the capacitor 11 having a small inductance, so that the present arrangement enables to suppress current ripples.

Figure 2:
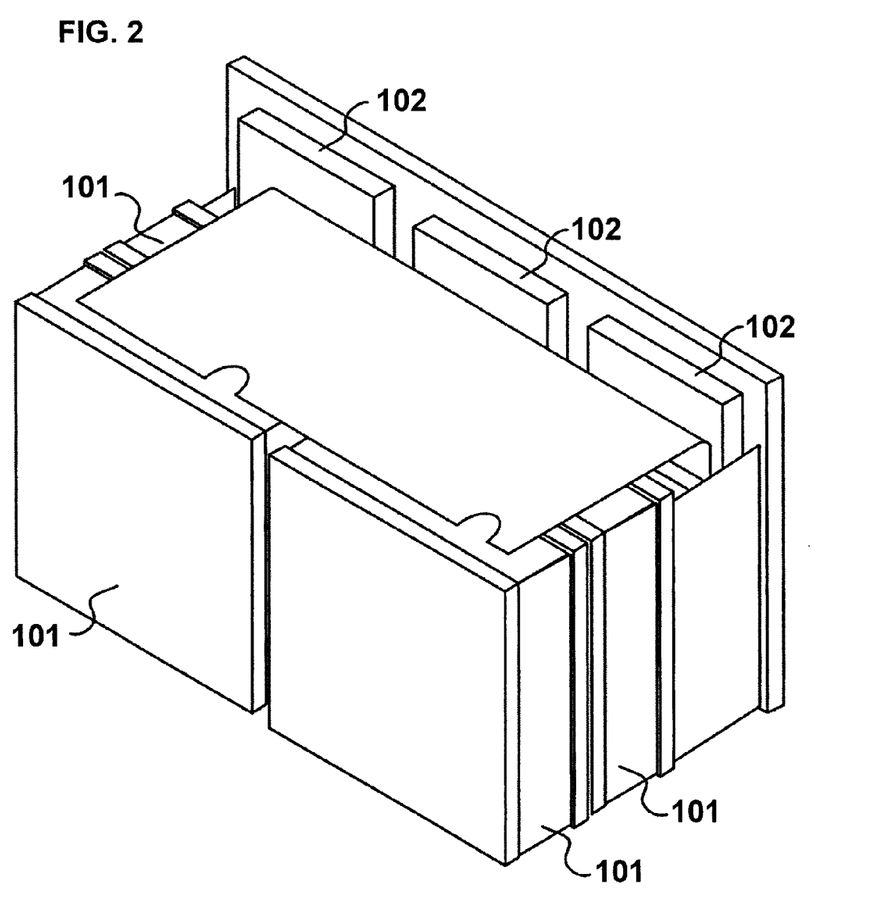
FIG. 2 is a perspective view illustrating the configuration of components of a semiconductor power converter as represented by the inverter and the DC-DC converter of FIG. 1.

FIG. 2 illustrates a configuration example of components of a semiconductor power converter as represented by the DC-DC converter 9 or the inverter 6. Reference number 101 denotes a filter capacitor of the power converter, and 102 denotes a semiconductor electric power conversion device. The filter capacitor 101 of FIG. 2 corresponds to capacitor 5, 8 and 11 of FIG. 1, and the semiconductor electric power conversion device 102 of FIG. 2 corresponds to the switching device 9-1 of FIG. 1.

According to the arrangement illustrated in FIG. 2, the filter capacitors 101 and the semiconductor electric power conversion devices 102 are arranged approximate one another while a battery not shown is arranged in a separate location, so that the inductance Lc in the electric wiring 12 in FIG. 1 will be smaller than the total inductance Lb of in the electric wiring 12 and 13, so that the current ripples overlapped via the semiconductor electric power conversion device 102 can be absorbed via the filter capacitor 101.

On the other hand, if it is not possible according to the arrangement of the device to integrate the filter capacitor 101 and the semiconductor electric power conversion device 102 as shown in FIG. 2 and if the relationship of inductance Lc of the electric wiring 12 and the total inductance Lb of the electric wiring 12 and 13 does not satisfy the above expression (1), similar effects can be achieved by inserting a reactor to the electric wiring of the battery 10.

Embodiment 2

Figure 3:
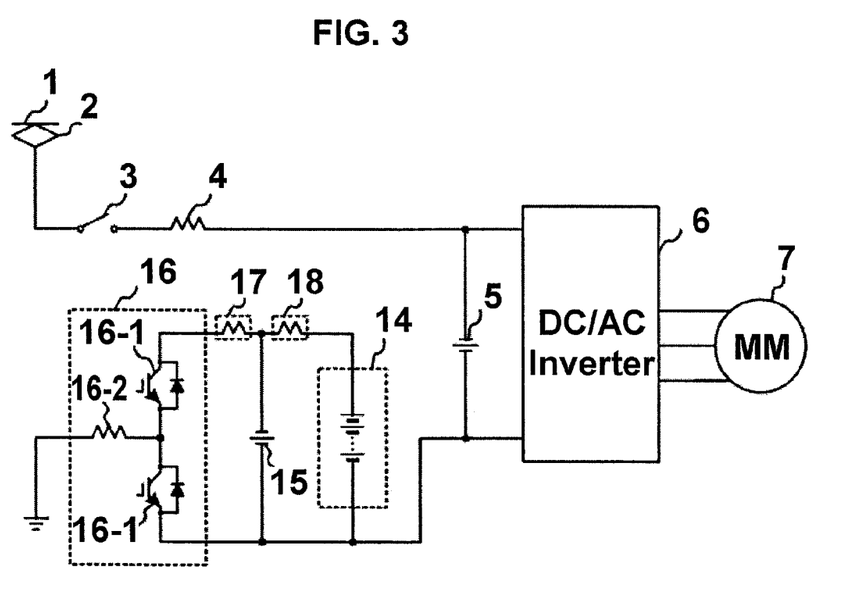
FIG. 3 is a configuration diagram of a power converter according to the (second embodiment of the) present invention.

FIG. 3 illustrates a second embodiment of a power converter of a rolling stock according to the present invention. The same components as those included in FIGS. 1 and 6 are denoted with the same reference numbers.

In the power converter of FIG. 3, reference number 1 denotes an overhead trolley, 2 denotes a current collector, 3 denotes a contactor, 4 denotes a reactor, 5 and 15 denote a capacitor, 6 denotes an inverter, 7 denotes an electric motor, 14 denotes a battery, 16 denotes a DC-DC converter, 17 denotes an electric wiring connecting the capacitor 15 and the DC-DC converter 16, and 18 denotes an electric wiring connecting the battery 14 and the DC-DC converter 16. According to the present embodiment, the battery 14 (first power storage means), the DC-DC converter 16, the electric wiring 17 and 18 connecting the above components and the capacitor 15 are arranged between one end of the capacitor 5 and the ground, and connected as illustrated.

In the drawing, 16-1 denotes a switching device and 16-2 denotes a reactor formed within the DC-DC converter 16. The inductances of electric wiring 17 and electric wiring 18 satisfy a similar relationship of inductances of electric wiring 12 and electric wiring 13 illustrated in FIG. 1, wherein the inductance contained in electric wiring 17 is denoted as Lc and the total inductance contained in electric wiring 17 and electric wiring 18 is denoted as Lb. Thus, the relationship of inductances of electric wiring 17 and electric wiring 18 satisfies the relationship shown in expression (1).

Now, we will describe the operation of FIG. 3. In the present embodiment, the input voltage of the inverter 6 is increased via the battery 14 and the DC-DC converter 16 so as to expand the characteristic area of the electric motor 7 in a high-speed area, according to which the performances of power running and regeneration braking are enhanced (refer to the description related to patent document 2). The DC-DC converter 16 (second electric power conversion means) constitutes a DC-DC conversion control means for controlling the DC voltage of the first DC electric power of the inverter 6 (first electric power conversion means) by the second DC electric power according to the device.

The elevation of input voltage of the inverter 6 is controlled via the switching device 16-1 of the DC-DC converter 16, but also according to the present embodiment, current ripples occur by the operation of the switching device 16-1.

Now, since the inductance Lc of the electric wiring 17 and the total inductance Lb of the electric wiring 17 and 18 satisfy the above-described expression (1), the DC components of the discharge and charge current flow to the battery 14 having a large inductance and the ripples as AC components flow to the capacitor 15 having a smaller inductance.

The present embodiment also adopts a structure in which the filter capacitor 101 and the semiconductor electric power conversion element 102 are integrated and a battery not shown is arranged in a separate location, as shown in FIG. 2, so that the inductance Lc contained in the electric wiring of the filter capacitor 101 becomes smaller than the inductance Lb included in the electric wiring of the battery not shown, according to which the present embodiment can suppress the current ripples of the battery 14, similar to embodiment 1.

Embodiment 3

Figure 4:
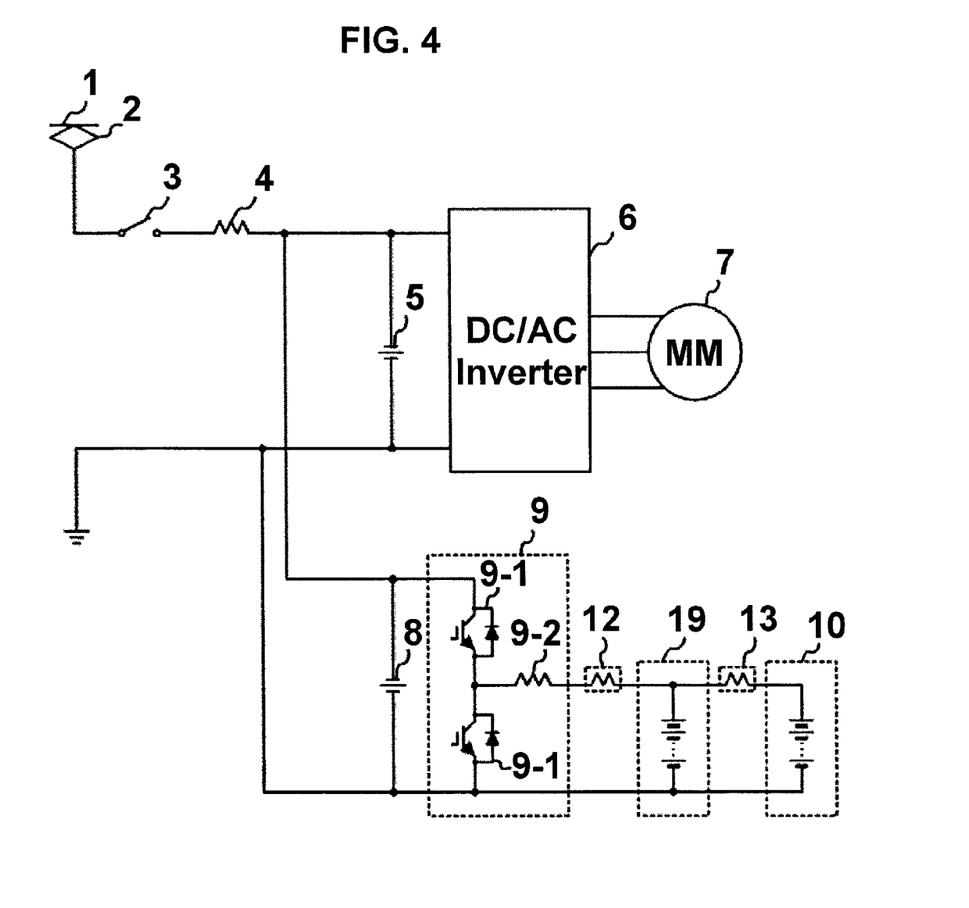
FIG. 4 is a configuration diagram of a power converter according to the (third embodiment of the) present invention.

FIG. 4 illustrates a third embodiment of a power converter of a rolling stock according to the present invention. The same components as those shown in FIGS. 1, 3 and 6 are denoted with the same reference numbers.

FIG. 4 has replaced the capacitor 11 (a device having a power storage function) of FIG. 1 with a battery 19 (second power storage means). Therefore, the battery 19 has a function to suppress ripple components and constitutes a ripple suppression means. Now, battery 10 (first power storage means) and battery 19 (second power storage means) have different power storage properties, wherein battery 10 has a greater battery capacity than battery 19 and the inner impedance of battery 10 is greater than the inner impedance of battery 19. Further, the inductance Lc of the electric wiring 12 and the total inductance Lb of the electric wiring 12 and electric wiring 13 satisfy the relationship of expression (1), similar to the first embodiment of the present invention.

According to the above arrangement, the DC components included the discharge and charge current flow to the battery 10 having a greater inductance, while the ripples as AC components flow to the battery 19 having a smaller inductance, so that the arrangement enables to suppress ripples in the current flowing to the battery 10.

Embodiment 4

Figure 5:
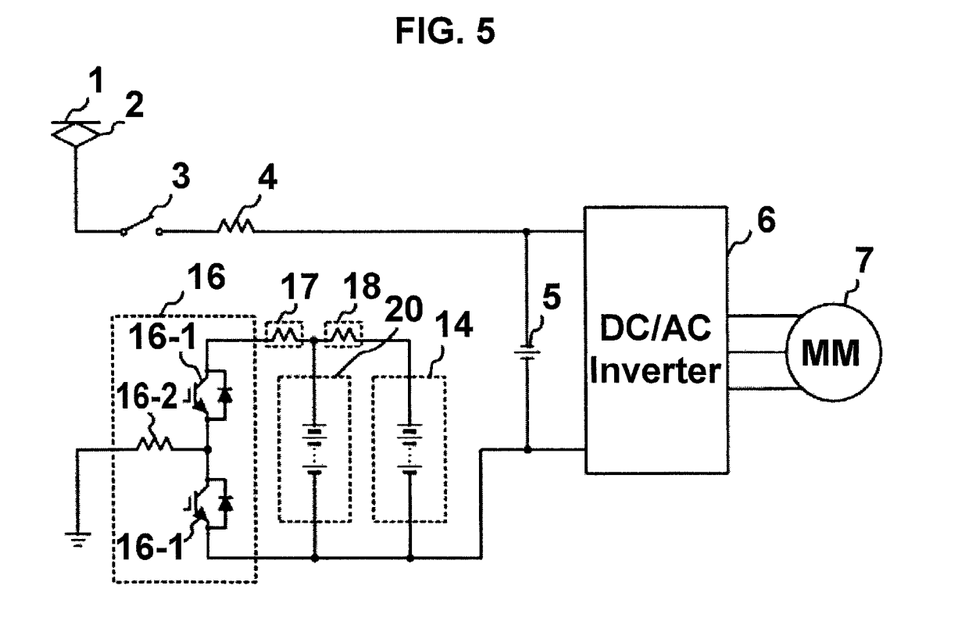
FIG. 5 is a configuration diagram of a power converter according to the (fourth embodiment of the) present invention.

FIG. 5 is a drawing illustrating a fourth embodiment of a power converter of a rolling stock according to the present invention. The same components as those shown in FIGS. 1, 3, 4 and 6 are denoted with the same reference numbers.

FIG. 5 has replaced the capacitor 15 of FIG. 3 with a battery 20. In the present embodiment, battery 14 and battery 20 have different power storage properties, wherein battery 14 has a greater battery capacity than battery 20 and the inner impedance of battery 14 is greater than the inner impedance of battery 20. Further, the inductance Lc of the electric wiring 17 and the total inductance Lb of the electric wiring 17 and electric wiring 18 satisfy the relationship of expression (1), similar to the second embodiment of the present invention. According to the present arrangement, the DC components including the discharge and charge current flow to the battery 14 having a greater inductance, while the ripples as AC components flow to the battery 20 having a smaller inductance, so that the arrangement enables to suppress ripples in the current flowing to the battery 14.

What is claimed is:

1. A power converter comprising:
a first electric power conversion means including an inverter for converting a first DC electric power to an AC electric power;
an AC circuit connected subsequent the first electric power conversion means;
wherein the power converter further comprises:
a second electric power conversion means which is connected in parallel with a DC circuit of the first electric power conversion means, and which is configured to receive the first DC electric power and converting the same to a second DC electric power having a voltage level that differs from the voltage level of the first DC electric power;
a battery which is connected with a second DC electric power side of the second electric power conversion means, and which is configured to absorb ripple component included in a current of the second DC electric power; and
a first capacitor which is connected in parallel with the battery and connected with the second DC electric power side of the second electric power conversion means, and which has greater power storage capacity and greater inner impedance than those of the battery; and
a second capacitor which is connected with the first DC electric power side of the second electric power conversion means, and
wherein the second electric power conversion means, the battery and the capacitor are mutually connected so that inductance between the second electric power conversion means and the battery becomes smaller than inductance between the second electric power conversion means and the first capacitor.

* * * * *